Oct. 6, 1936.  D. F. ANGUISH ET AL  2,056,150
AUTOMOBILE SAFETY DEVICE
Filed March 18, 1935
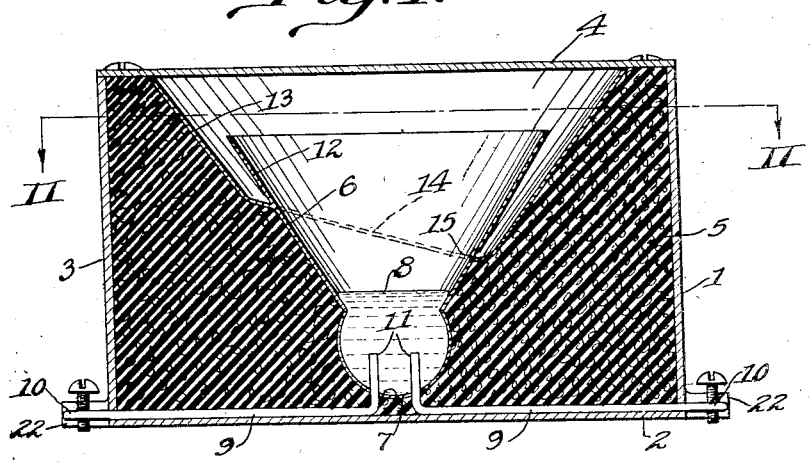
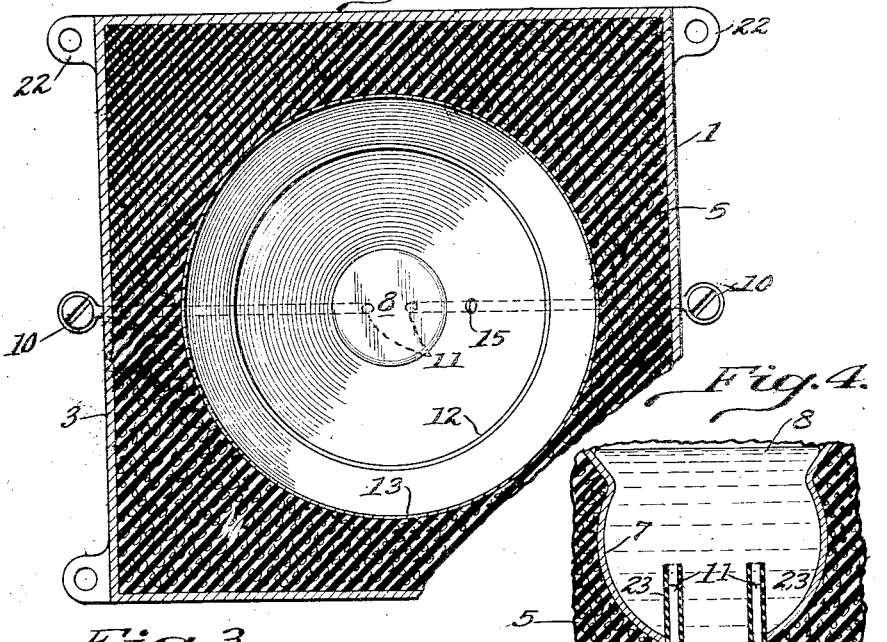
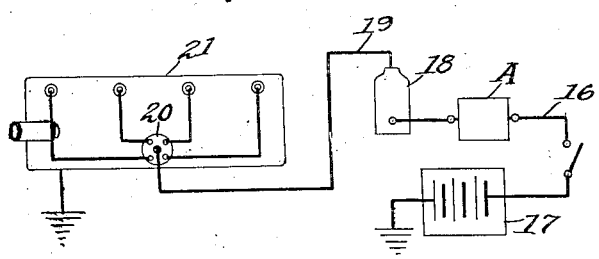
Inventor
Doward F. Anguish
Irvin W. Folk
W. S. McDowell
Attorney Patented Oct. 6, 1936

2,056,150

UNITED STATES PATENT OFFICE 2,056,150

AUTOMOBILE SAFETY DEVICE

Doward F. Anguish, Canal Winchester, and Irvin W. Folk, Columbus, Ohio

Application March 18, 1935, Serial No. 11,544

2 Claims. (Cl. 200—52)

This invention relates to an improved emergency cut-out switch for the ignition circuits of automobile engines, and the primary object of the invention resides in the provision of a switch which will serve automatically to arrest the operation of the engine when an automobile, through accident or otherwise, turns over or assumes an extreme angle with respect to its normal horizontal plane of operation, in order to minimize fires and explosions which often follow automobile accidents and thereby increase the safety of the vehicle occupants.

Frequently, as the result of an accident, an automobile will turn completely over and come to rest on its side or top with its engine running, with the result that the fuel contained in its supply tank becomes ignited through the exhaust of the running motor or from short circuiting of the ignition and lamp illuminating circuits. Often, due to incapacitation as a result of such accidents, the vehicle operator is unable to arrest the operation of the motor and dangerous fires and explosions are quite apt to ensue.

The present invention therefore consists in the provision of an emergency switch will not interfere in any way with the operation of a motor vehicle when normal conditions obtain but which, in the event the vehicle should meet with an accident and turn over, either on its top or side, will be automatically operated to prevent the passage of electric current to the ignition and other electrical circuits of the vehicle, thereby immediately arresting the operation of the engine and minimizing fire hazards.

For a further understanding of the invention, reference is to be had to the following description and the accompanying drawing, wherein:

Fig. 1 is a vertical sectional view taken through the emergency cut-out switch comprising the present invention;

Fig. 2 is a horizontal sectional view taken through the switch on the plane indicated by the line II—II of Fig. 1;

Fig. 3 is a diagrammatic view of a motor vehicle ignition circuit disclosing the operative position of the switch comprising the present invention therein;

Fig. 4 is an enlarged detail sectional view taken through the sump of the container for the fluid conductor.

Referring more particularly to the drawing, the improved switch comprising the present invention provides a casing 1 which is formed to include a bottom 2, upstanding rectangular side walls 3 and a removable top wall 4, the casing being normally closed as shown in Fig. 1. Within the hollow interior thereof, the casing is adapted to receive a body of resilient shock absorbing material 5, such as sponge rubber, and positioned within this material is a container 6, which is preferably formed from a non-corroding material, such as resinous condensation products, glass, porcelain or special metals, alloyed to resist corrosion.

In the specific form of the invention here under consideration, the container is formed to embody a substantially spherical sump 7 in which is received a body of a fluid conductor 8 of electricity, such as mercury, which normally fills the sump. Entering the casing 1 through its side walls are current conductors 9, provided at their outer ends with screw-equipped terminals 10, and having their inner ends terminated in fixed, relatively spaced upright terminal extensions 11, which extend through the wall of the sump 7 and are adapted to be normally immersed in the fluid conductor 8, so that electric current may freely travel from one of the solid conductors 9 to the other.

Above the sump 7, the container 6 is formed to include a funnel 12 and the open top of said funnel is surrounded by an enlarged trap or basin 13, the side walls of which extend below the plane defining the top of said funnel, the bottom of the trap or basin being inclined, as indicated at 14, with respect to the horizontal. The funnel 12 contiguous to the lowest portion of the trap or basin 13 has its wall provided with a small opening 15 which constitutes a restricted return so that when the conductor fluid 8 is caught in the trap or basin 13, its return to the sump 7 will be delayed even after the switch assumes its normal position, as shown in Fig. 1.

In the use of the switch mechanism, the same, as shown in Fig. 3 by the letter A, is disposed in a line 16 extending from a battery 17 to an ignition coil 18, and from the coil 18 a conductor 19 extends to the usual distributor 20 of an internal combustion engine 21. Preferably, the lower portion of the casing 1 is provided at its corners with apertured lugs 22 by which the switch mechanism A may be mounted on any suitable form of a horizontal support, not shown, of a motor vehicle.

By this construction, when a motor vehicle is operating in a normal manner, the emergency switch mechanism provides for the ready passage of current therethrough so that the ignition system of the engine of the vehicle may function in the usual way. However, should the vehicle upset, from accident or other cause, the mercury 8 contained in the sump 7 is displaced from the container 6 so that current flow between the terminal extensions 11 is interrupted, thus breaking the ignition circuit and immediately arresting the operation of the engine. The displaced mercury flows from the funnel 12 into the surrounding trap or catch basin 13 in which it is held and following an accident, should the vehicle again right itself, the ignition circuit will remain open since it will take an appreciable interval of time for the mercury to pass through the restricted aperture 15 and again fill the sump 7 to an extent necessary to bridge the conductor terminals 11. Preferably, the conductors 9 are surrounded by tubular insulating sleeves 23 which completely cover and extend somewhat above the upper ends of the conductor extensions 11, as shown in Fig. 4, so that the mercury will be compelled to rise above the tops of the sleeves 23 within the sump 7 before normal circuit conditions can be restored.

The switch is essentially simple in its construction and even after long periods of use, is not likely to become out of order or to occasion repair, substitution or adjustment. Moreover, its operation is entirely automatic or devoid of manual control. In fact, the operator of the vehicle need not be aware of the presence of the switch since it does not enter in any way in the ordinary control of the operation of a motor vehicle.

What is claimed is:

1. An emergency cut-out switch for the ignition circuit of an automobile engine, comprising a normally closed casing, a container for a fluid conductor of electricity disposed within said casing, the upper portion of said container being substantially of funnel shaped configuration and having the lower portion thereof formed to provide a restricted sump in which said fluid conductor is normally received, circuit terminals mounted in fixed spaced relationship within said sump and adapted to be normally immersed in the fluid conductor, the open top of said container being spaced from the top of said casing, a trap surrounding the open upper portion of said container and spaced from the walls thereof to provide a receptacle for the reception of the fluid conductor when said switch is substantially inverted, there being a restricted aperture providing communication between the lower portion of said trap and said container, whereby to admit of a delayed return of the fluid conductor to said container following restoration of the switch to its normal operating position, and resilient means spacing said container from the walls of said casing.

2. A cut-out switch for the ignition circuit of an automobile engine, comprising a cone-shaped vessel formed at its lower end with a spherical sump for the reception of a fluid conductor of electricity, a second cone-shaped vessel surrounding said first-named vessel and joined at its lower edge thereto, the upper edge of said second vessel extending above the upper edge of said first vessel, said vessels having a space formed between their side walls, which space communicates with the interior of said first vessel through a restricted port, a rectangular casing provided with a cover which is engaged by said second vessel, a body of resilient material positioned in said casing and serving to space said vessels from the side and bottom walls of said casing, and a pair of spaced terminals positioned within said sump and extending to opposite sides of said casing.

DOWARD F. ANGUISH.
IRVIN W. FOLK.